(12) United States Patent
Sasaki et al.

(10) Patent No.: US 7,628,071 B2
(45) Date of Patent: Dec. 8, 2009

(54) SENSING UNIT AND METHOD OF MAKING SAME

(75) Inventors: Yoshitaka Sasaki, Santa Clara, CA (US); Tatsushi Shimizu, Hong Kong (CN); Takehiro Horinaka, Milpitas, CA (US); Kazuo Ishizaki, Milpitas, CA (US); Shigeki Tanemura, Santa Clara, CA (US)

(73) Assignees: Headway Techologies, Inc., Milpitas, CA (US); SAE Magnetics (H.K.) Ltd., Shatin (HK)

( * ) Notice: Subject to any disclaimer, the term of this patent is extended or adjusted under 35 U.S.C. 154(b) by 55 days.

(21) Appl. No.: 11/812,629

(22) Filed: Jun. 20, 2007

(65) Prior Publication Data

US 2008/0314146 A1 Dec. 25, 2008

(51) Int. Cl.
*G01P 15/10* (2006.01)
*G01P 15/12* (2006.01)
*G01P 15/11* (2006.01)

(52) U.S. Cl. ............... 73/514.29; 73/514.33; 73/514.31

(58) Field of Classification Search .............. 73/514.01, 73/514.16, 514.31, 514.39, 514.29, 514.33, 73/862.59, 862.41
See application file for complete search history.

(56) References Cited

U.S. PATENT DOCUMENTS

| | | | | |
|---|---|---|---|---|
| 5,739,431 A | * | 4/1998 | Petri | 73/509 |
| 5,763,783 A | * | 6/1998 | Asada | 73/514.31 |
| 7,132,722 B2 | * | 11/2006 | Ohashi | 257/415 |
| 7,443,158 B2 | * | 10/2008 | Oohashi et al. | 324/207.22 |
| 2008/0313882 A1 | * | 12/2008 | Sasaki et al. | 29/592.1 |

* cited by examiner

*Primary Examiner*—Helen C. Kwok
(74) *Attorney, Agent, or Firm*—Oliff & Berridge, PLC

(57) ABSTRACT

In a sensing unit according to the present invention, a movable portion of a spring portion is supported floatably above a recessed portion formed in a substrate. Thus, the movable portion is capable of oscillating in any direction parallel to the substrate surface. Moreover, the movable portion is capable of oscillating in the thickness direction of the substrate such that the amplitude of a center side end portion thereof reaches a maximum. A sensor portion is provided on the movable portion. As a result, the sensing unit according to the present invention has a higher degree of freedom in terms of the measurement direction than a conventional sensing unit that oscillates in only one direction.

9 Claims, 8 Drawing Sheets (a)

(b)

(a)

(b)

(c)

(d)

(a)

(b)

US 7,628,071 B2

SENSING UNIT AND METHOD OF MAKING SAME

BACKGROUND OF THE INVENTION

1. Field of the Invention

The present invention relates to a sensing unit and a method of making the sensing unit.

2. Related Background Art

A silicon acceleration sensor employing MEMS technology is known from the prior art as an acceleration sensor (accelerometer).

A sensing unit of this silicon acceleration sensor is typically made through a process such as that shown in FIG. 8. More specifically, when making a sensing unit 110 of the silicon acceleration sensor, first, as shown in (a) of FIG. 8, a photomask 102 having a pattern of stripes arranged in parallel is formed on a silicon substrate 100. Deep etching (at an etching depth of 25 to 30 µm) using the photomask 102 is then performed, thereby forming a plurality of parallel trenches 104. Then, as shown in (b) of FIG. 8, an $SiO_2$ film 106 is deposited on an upper surface of the substrate 100 and an inner wall surface of the trenches 104. Next, as shown in (c) of FIG. 8, a bottom surface part of the trenches 104 is partially removed by isotropic etching such that adjacent trenches 104 are connected to each other by the bottom surface part. As a result, a cantilever part 108 capable of reciprocating in a single parallel direction (in other words, the arrangement direction) to the surface direction of the substrate 100 is formed between the adjacent trenches 104.

In the sensing unit 110 having the structure shown in FIG. 8, acceleration is measured on the basis of variation in electrostatic capacity accompanying oscillation of the cantilever part (movable part) 108.

SUMMARY OF THE INVENTION

However, the following problem exists in a conventional sensing unit such as that described above. The cantilever part can only oscillate in its arrangement direction, and therefore the sensing unit is capable of measuring acceleration in only one direction.

The present invention has been designed to solve this problem, and an object thereof is to provide a sensing unit having a high degree of freedom in terms of a measurement direction, and a method of making the sensing unit.

A sensing unit according to the present invention comprises: a substrate formed with a recessed portion; a spring portion having a support portion positioned on an edge portion of the recessed portion and a flat coil-shaped movable portion positioned above the recessed portion and supported floatably by the support portion; and a sensor portion provided on the movable portion of the spring portion, for detecting displacement in the movable portion.

In this sensing unit, the movable portion of the spring portion is supported floatably above the recessed portion formed in the substrate. Thus, the movable portion is capable of oscillating in any direction parallel to the substrate surface. Moreover, the movable portion is capable of oscillating in the thickness direction of the substrate such that the amplitude of a center side end portion thereof reaches a maximum. The sensor portion is provided on the movable portion. As a result, the sensing unit according to the present invention has a higher degree of freedom in terms of the measurement direction than a conventional sensing unit that oscillates in only one direction.

In another aspect, the spring portion may be formed from a conductive material. In this case, the spring portion can be used as a signal transmission path of the sensor portion.

In another aspect, the spring portion may be formed by plating. In this case, a thinner movable portion than that of a case in which the movable portion of the spring portion is formed by deep etching can be formed.

In another aspect, the sensor portion may be constituted by a GMR sensor. In this case, the sensor portion can be reduced in size, and a corresponding reduction in the size of the sensing unit can be achieved.

In another aspect, a weighted portion may be formed on a center side end portion of the movable portion of the spring portion. In this case, the oscillation amount of the movable portion increases, and as a result, an improvement in the measurement precision of the sensor portion is achieved.

In another aspect, the sensor portion may be provided on the movable portion in a position near the support portion. The amount of displacement in the movable portion is greatest near the support portion, and by providing the sensor portion in this position, an improvement in the measurement precision of the sensor portion is achieved.

In another aspect, a plurality of the sensor portions may be provided on the movable portion. In this case, the measurement direction of the sensing unit can be diversified, the measurement precision can be improved, and so on.

In another aspect, the substrate may be held so as to extend in a vertical direction, and in another aspect, the substrate may be held so as to extend in a horizontal direction. By determining the extension direction of the substrate appropriately, a sensing unit that is highly sensitive in a desired direction can be obtained.

A method of making a sensing unit according to the present invention is a method of making a sensing unit having: a substrate formed with a recessed portion; a spring portion having a support portion positioned on an edge portion of the recessed portion and a flat coil-shaped movable portion positioned above the recessed portion and supported floatably by the support portion; and a sensor portion provided on the movable portion of the spring portion, for detecting displacement in the movable portion. The method comprises the steps of burying the recessed portion formed in the substrate with a resist layer to make the recessed portion flat; forming a plating layer that is to become the spring portion such that a part that is to become the support portion is positioned on the edge portion of the recessed portion and a part that is to become the movable portion is positioned on the resist layer, forming the sensor portion on the part of the plating layer that is to become the movable portion; and removing the resist layer.

In this method of making a sensing unit, the movable portion of the spring portion is formed by the plating layer and supported floatably above the recessed portion formed in the substrate. Thus, the movable portion is capable of oscillating in any direction parallel to the substrate surface. Moreover, the movable portion is capable of oscillating in the thickness direction of the substrate such that the amplitude of a center side end portion thereof reaches a maximum. The sensor portion is provided on the movable portion. Hence, according to the method of making a sensing unit of the present invention, a sensing unit having a higher degree of freedom in terms of the measurement direction than a conventional sensing unit that oscillates in only one direction can be obtained. Furthermore, the spring portion is formed by the plating layer, as described above, and therefore the thickness thereof can be reduced in comparison with a case in which the spring portion is formed by deep etching.

DESCRIPTION OF THE PREFERRED EMBODIMENTS

A preferred embodiment of the present invention will be described in detail below with reference to the attached drawings. Note that identical or similar elements have been allocated identical reference symbols, and duplicate description thereof has been omitted.

A sensing unit used in an acceleration sensor will be described below as a sensing unit according to an embodiment of the present invention. This sensing unit is capable of detecting acceleration applied to the sensing unit by transmitting a displacement-related signal to a predetermined control portion.

Figure 1:
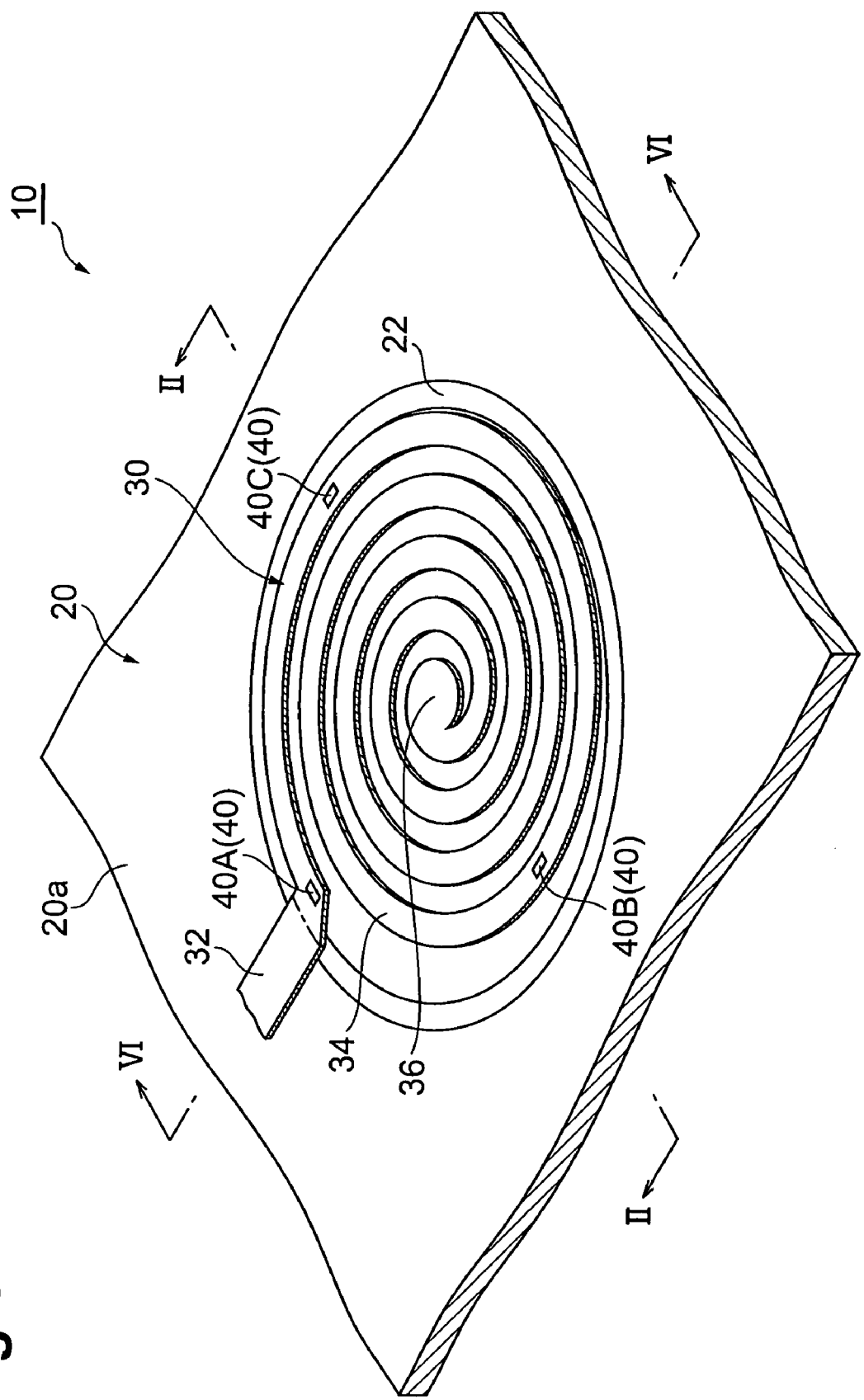
FIG. 1 is a schematic perspective view showing a sensing unit according to an embodiment of the present invention.
Figure 2:
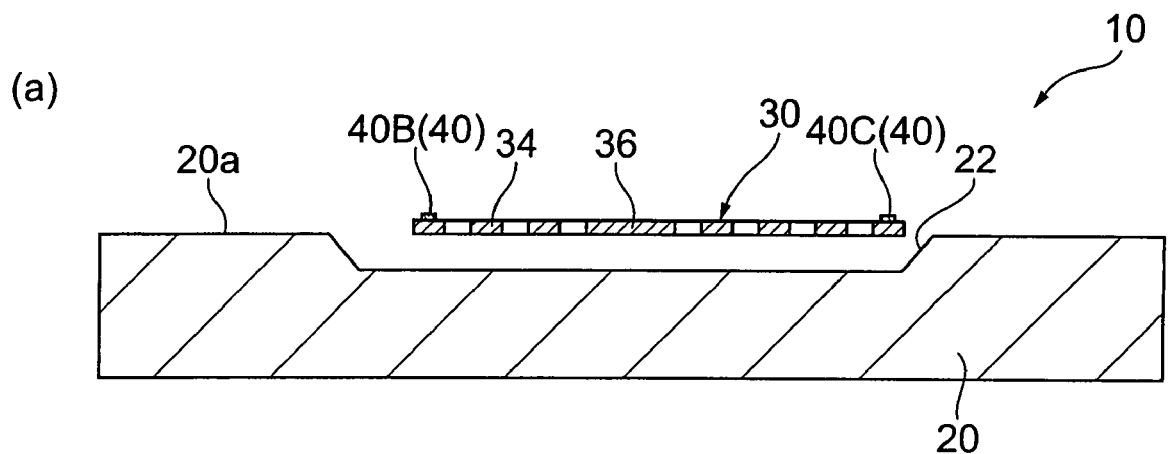
FIG. 2 is a sectional view taken along a line II-II of the sensing unit shown in FIG. 1.
Figure 2:
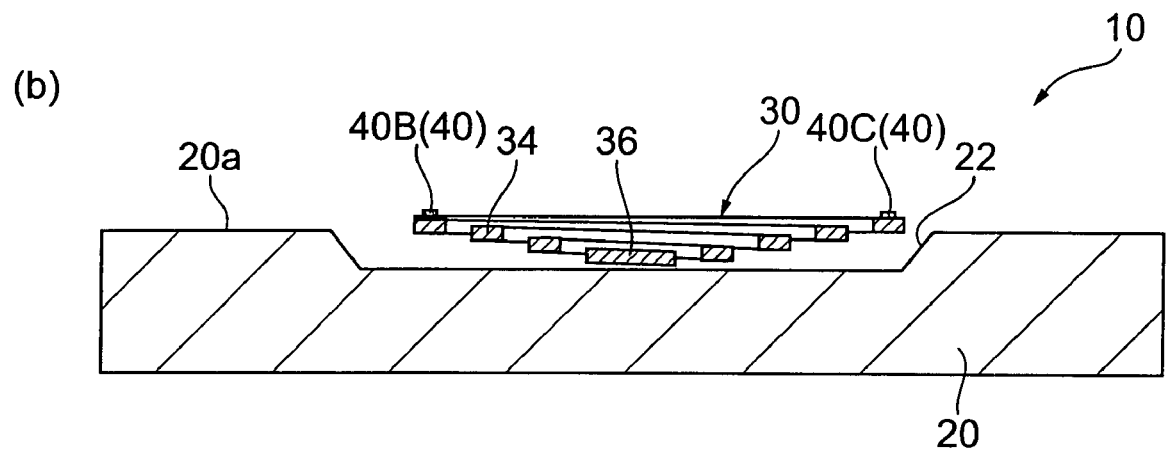

FIG. 1 is a schematic perspective view showing a sensing unit 10 according to an embodiment of the present invention. FIG. 2 is a sectional view taken along a line II-II of the sensing unit 10 shown in FIG. 1, (a) showing a non-elongated state and (b) showing an elongated state. As shown in FIGS. 1 and 2, the sensing unit 10 comprises a substrate 20 and a spring portion 30 provided on the substrate 20.

The substrate 20 is formed from $Al_2O_3$, for example, and a surface 20a thereof is flat A hole (recessed portion) 22 having a substantially circular cross-section is provided in the surface 20a of the substrate 20. The depth of the hole 22 is set at approximately 0.5 to 3.0 μm when shallow, and approximately 3.0 to 10 μm when deep, for example.

Figure 3:
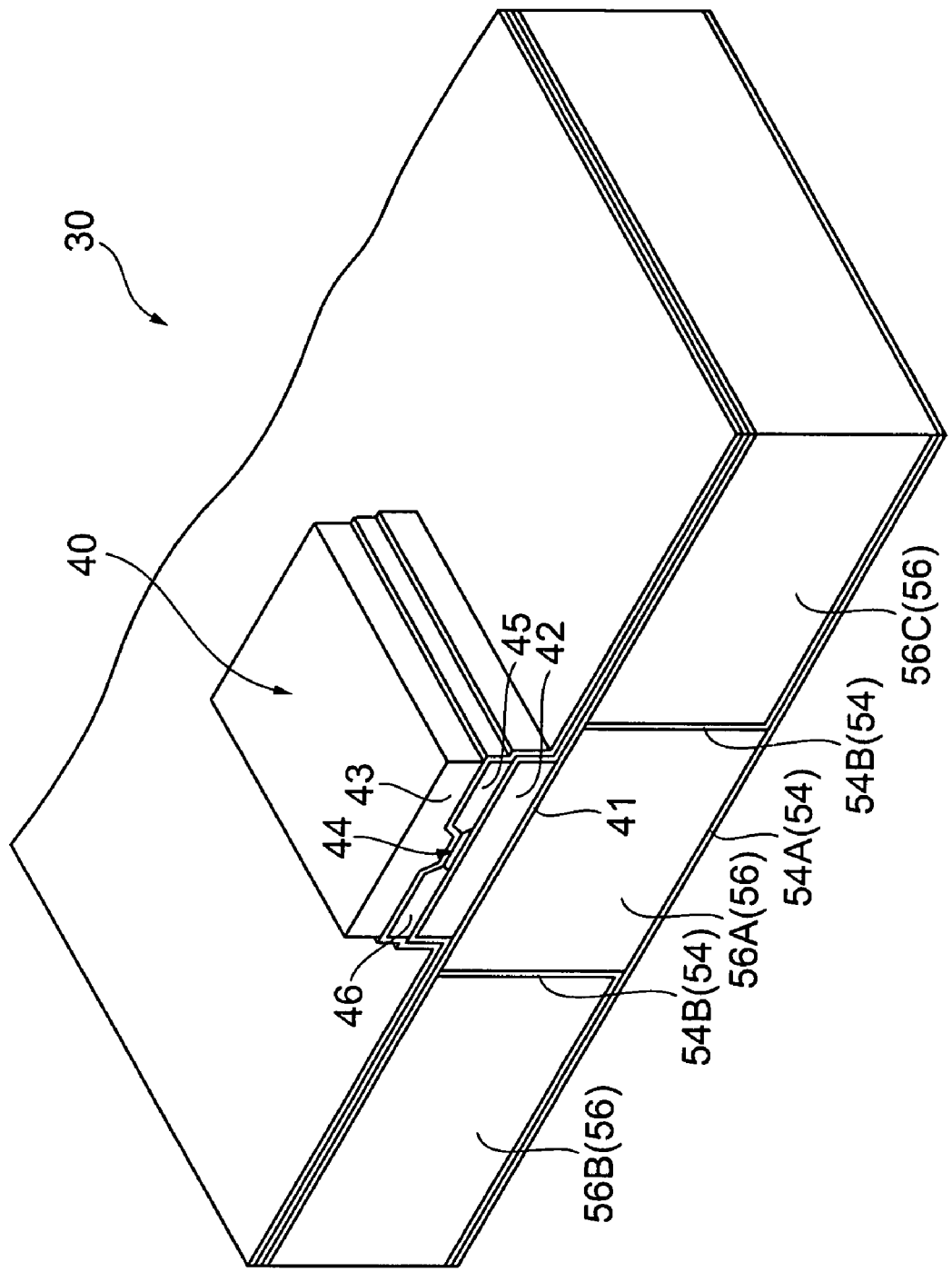
FIG. 3 is a view showing the schematic constitution of a sensor portion formed on a plating layer.

The spring portion 30 is a thin film member extending parallel to the substrate surface 20a of the substrate 20, and is formed by subjecting a conductive material such as Cu or Ni to plating. The spring portion 30 is constituted by a support portion 32 and a movable portion 34. Further, as shown in FIG. 3, the spring portion 30 is constituted such that a plating layer 56 is divided horizontally into three regions (56A, 56B, 56C) by insulating film 54.

The support portion 32 of the spring portion 30 is a strip-form part positioned on the edge of the hole 22, and extends so as to overhang the hole 22. The movable portion 34 of the spring portion 30 is provided continuously from the overhanging end portion of the support portion 32, and is positioned above the hole 22 in the substrate 20. The movable portion 34 has a flat coil shape covering the entire hole 22, and orbits the central portion of the hole 22 a plurality of times in spiral form.

In the spring portion 30 having the constitution described above, the movable portion 34 is supported floatably above the hole by the support portion 32, and is formed in a shape (i.e. a flat plate shape) and from a material (i.e. a metallic material such as Cu or Ni) that make it highly susceptible to elastic deformation. Hence, the movable portion 34 is capable of oscillating in the surface direction of the substrate surface 20a (all directions parallel to the substrate surface), and capable of oscillating (elongating) in the thickness direction of the substrate 20, as shown in (b) of FIG. 2.

A weighted portion 36 having a greater width than the other parts of the movable portion 34 is formed on a center side end portion of the movable portion 34 of the spring portion 30. By providing the weighted portion 36 having a comparatively large volume on the center side end portion in this manner, an increase in the amount of oscillation of the movable portion 34 is achieved. If necessary, a projection may be provided on the upper surface or lower surface of the weighted portion 36 to achieve a greater increase in weight and a corresponding increase in the amount of oscillation of the movable portion 34.

Furthermore, the movable portion 34 of the spring portion 30 is provided with three sensor portions 40 (40A to 40C). The sensor portions 40 are GMR sensors (giant magneto-resistive sensors) that are mounted integrally on the upper surface of the movable portion 34. In the sensor portions 40, an electric resistance value varies when the movable portion 34 displaces (expands or contracts) in a specific direction, and the amount of displacement (amount of oscillation) and displacement direction (oscillation direction) of the movable portion 34 are detected from this resistance variation.

Each sensor portion 40 is structured as shown in FIG. 3, for example. FIG. 3 is a view showing the schematic constitution of the sensor portion 40 formed on the plating layer 56. The sensor portion 40 has a sandwich structure in which a bottom shield layer 42 and a top shield layer 43 made of an Fe—Ni alloy (permalloy) are formed on the plating layer 56 via an insulating film 41, and a junction portion 44 is sandwiched therebetween. A pair of electrode portions 45, 46 is formed so as to sandwich the junction portion 44 from the left and right. Although not shown in the drawing, the electrode portions 45, 46 are electrically connected to different plating layers 56A, 56B, 56C, respectively.

Here, as shown in FIG. 1, the sensor portion 40A of the three sensor portions 40 is provided on the movable portion 34 in a position near the support portion 32. Displacement of the movable portion 34 is greatest in this position, and therefore, by providing the sensor portion 40A in this position, slight oscillation of the movable portion 34 can be detected, enabling an improvement in the measurement precision of the sensor portions 40.

Each sensor portion 40 transmits an electric resistance value, which serves as a displacement-related signal, to a control portion, not shown in the drawing, via the conductive (plating layer 56 of the) movable portion 34. More specifically, the movable portion 34 of the sensing unit 10 is conductive, and therefore the sensor portions 40 can be disposed without providing separate wiring. Thus, a simple constitution with a small number of components is realized, enabling a reduction in manufacturing cost and simplification of the manufacturing process.

Further, the sensor portions 40 are preferably disposed on the end portion side in the width direction of the movable portion 34 of the spring portion 30, rather than in the central portion. The reason for this is that when the movable portion 34 oscillates so as to buckle partially, the end portion thereof expands and contracts more than the central portion, and therefore slight expansion and contraction can be detected, enabling an improvement in the measurement precision of the sensor portions 40.

As described in detail above, in the sensing unit 10, the movable portion 34 of the spring portion 30 is supported floatably above the hole formed in the substrate 20. Hence, the movable portion 34 is capable of oscillating in any direction parallel to the substrate surface 20a. The movable portion 34 is also capable of oscillating in the thickness direction of the substrate such that the amplitude of the center side end portion thereof reaches a maximum. The sensor portions 40 are provided on the movable portion 34. Thus, the sensing unit 10 has a greater degree of freedom in terms of the measurement direction than a conventional sensing unit that oscillates in only one direction.

Figure 8:
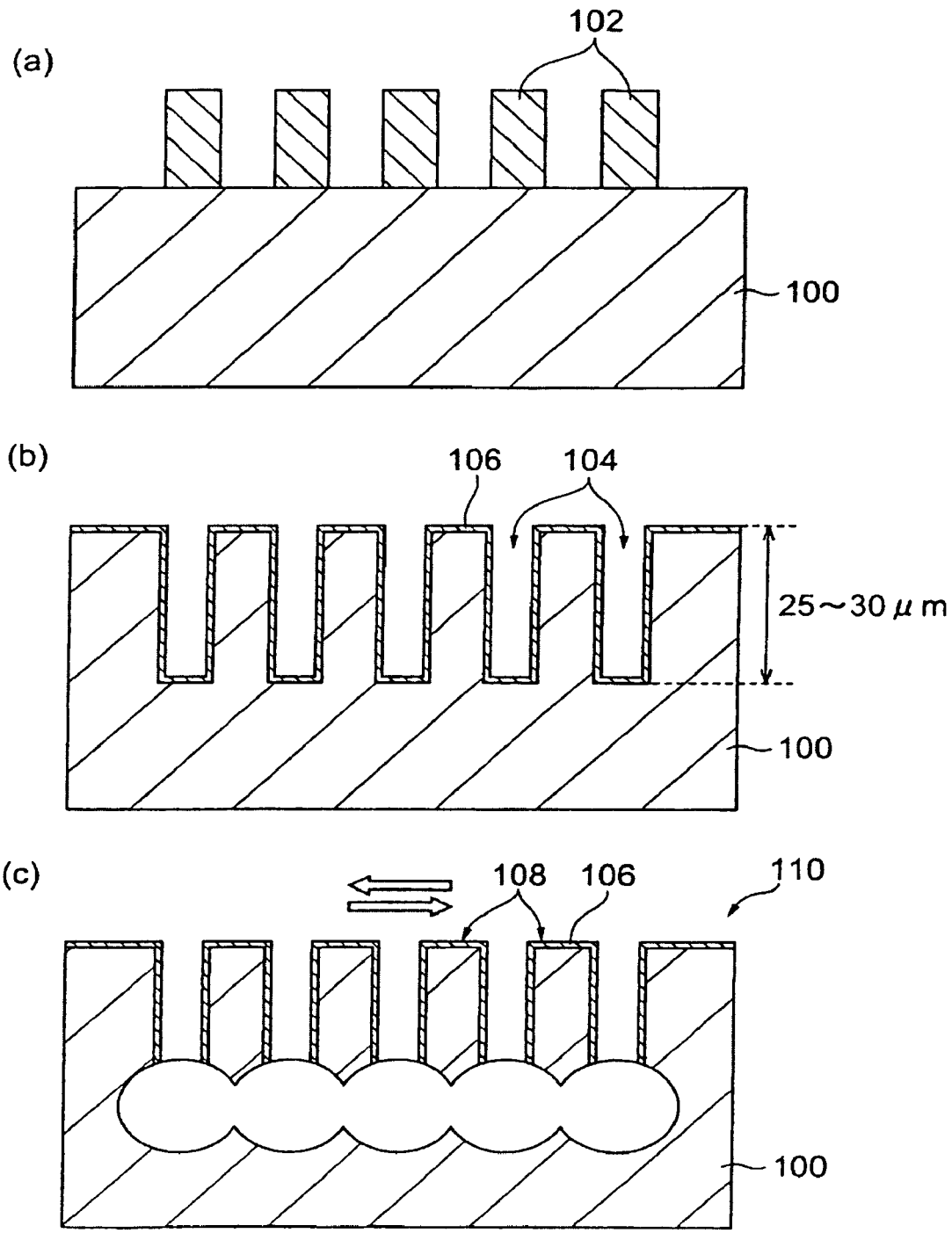
FIG. 8 is a view showing a procedure for making a sensing unit according to the prior art.

Further, the spring portion 30 is made of a conductive material, and therefore the spring portion 30 can be used as a signal transmission path of the sensor portions 40. In the embodiment described above, three signal transmission paths (i.e. the plating layer 56A, the plating layer 56B, and the plating layer 56C) are provided on the spring portion 30, and two of these signal transmission paths are used by the sensor portions 40. Furthermore, the insulating film 54 included in the spring portion 30 may be used as a capacitor, and a capacitance bridge may be formed by this capacitor. Further, the spring portion 30 is formed by plating, and therefore the movable portion 34 can be formed more thinly than in a case where the movable portion of the spring portion is formed by deep etching (as in the sensing unit 110 shown in (c) of FIG. 8).

Furthermore, the sensor portions 40 are constituted by GMR sensors, and therefore the sensor portions can be reduced in size, enabling a corresponding reduction in the size of the sensing unit 10. Moreover, the movable portion 34 is provided with three sensor portions 40, enabling diversification of the measurement direction of the sensing unit (for example, measurement in two axial directions or three axial directions). Furthermore, an even higher degree of measurement precision can be realized by determining a difference in the amount of displacement or the average amount of displacement from the detection signals of the sensor portions 40.

Note that the movable portion 34 takes a flat plate form, and can therefore oscillate easily in the thickness direction of the substrate 20, as shown in (b) of FIG. 2. As a result, the sensitivity of the sensing unit 10 in the thickness direction is improved. Accordingly, a sensing unit 10 that is highly sensitive to horizontal direction oscillation can be obtained by holding the sensing unit 10 such that the substrate 20 extends in a vertical direction. Furthermore, by holding the sensing unit 10 such that the substrate 20 extends in a horizontal direction, a sensing unit 10 that is highly sensitive to vertical direction oscillation can be obtained.

Next, a procedure for making the sensing unit 10 described above will be described with reference to FIGS. 4 to 6.

Figure 4:
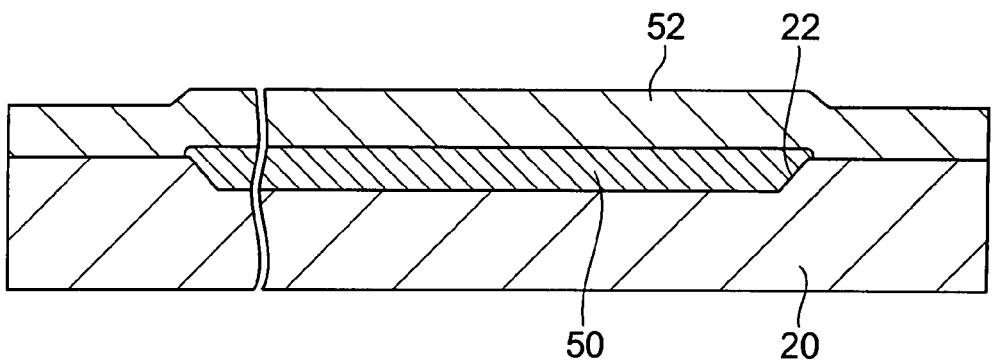
FIG. 4 is a sectional view showing a procedure for making the sensing unit, taken along the line II-II of FIG. 1.
Figure 4:
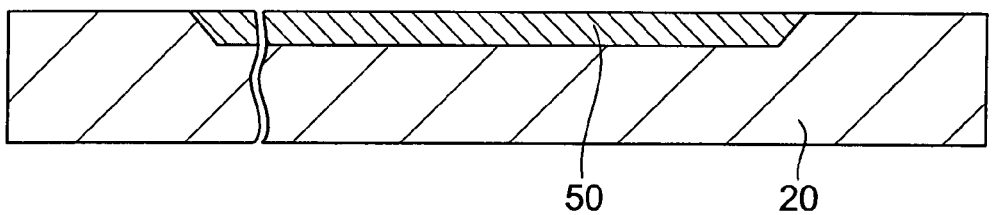
Figure 4:
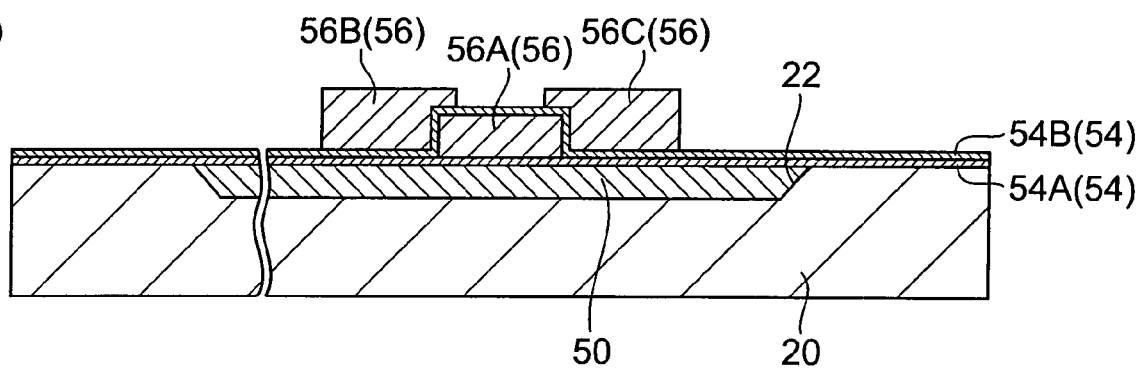
Figure 4:
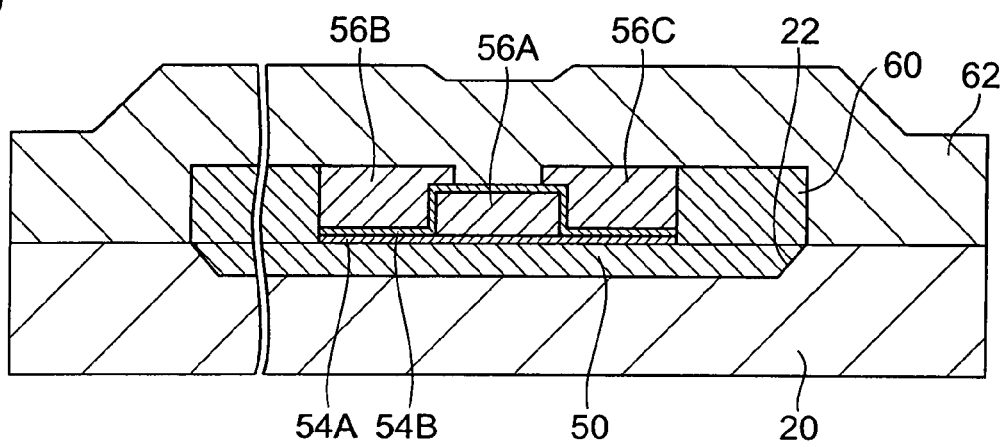
Figure 5:
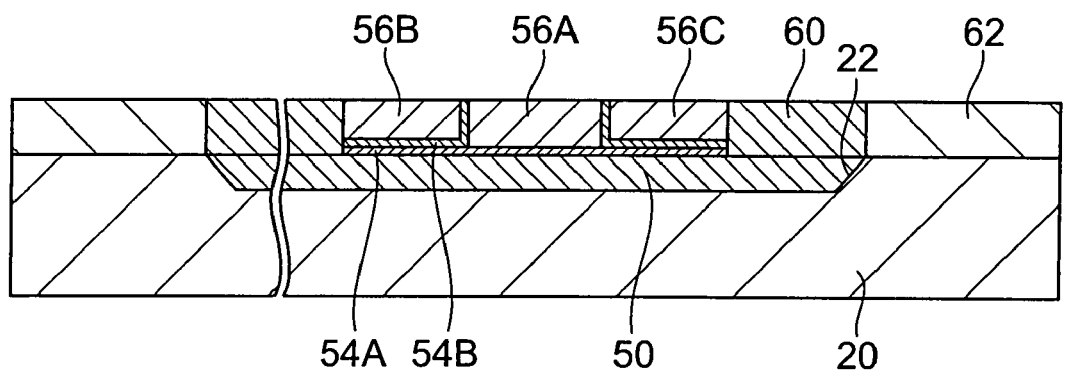
FIG. 5 is a sectional view showing a procedure for making the sensing unit, taken along the line II-II of FIG. 1.
Figure 5:
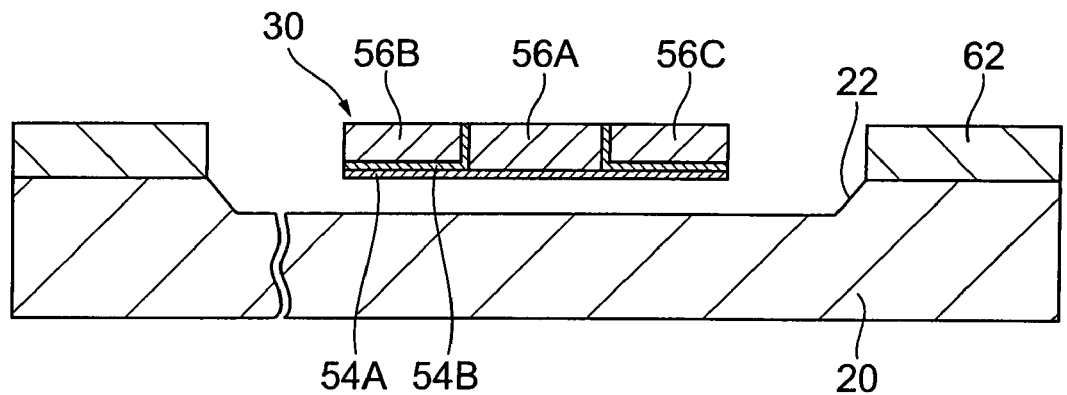
Figure 5:
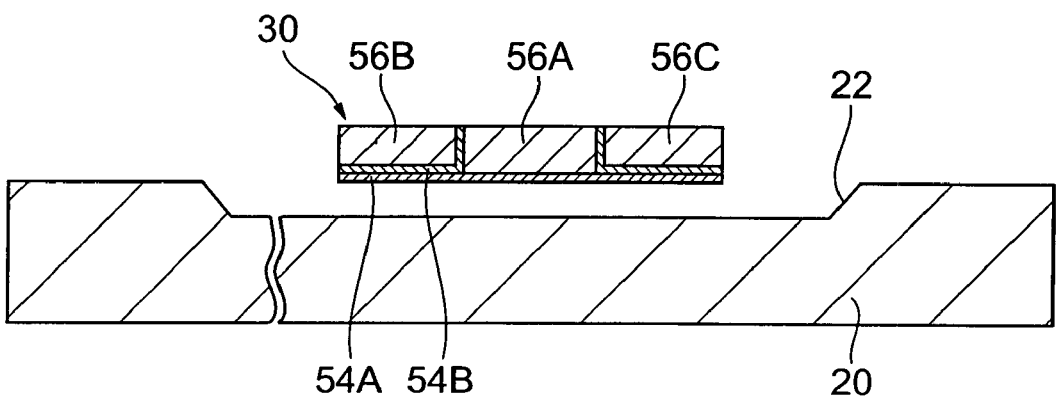
Figure 6:
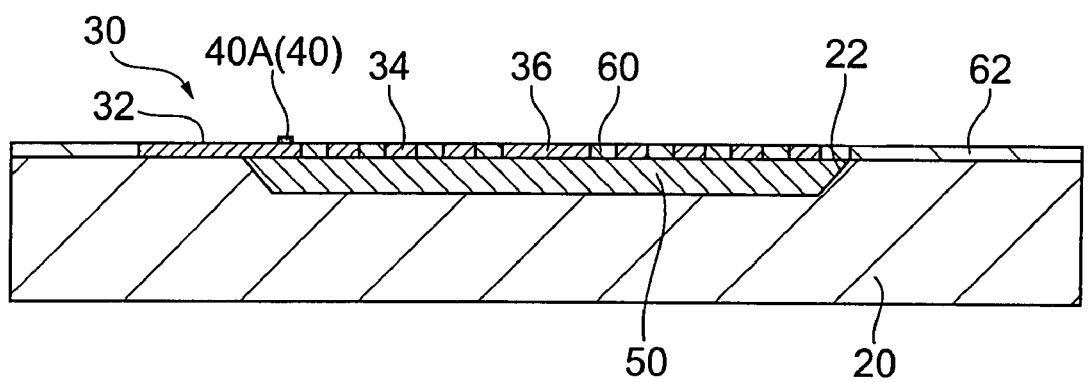
FIG. 6 is a sectional view showing a procedure for making the sensing unit, taken along a line VI-VI of FIG. 1.
Figure 6:
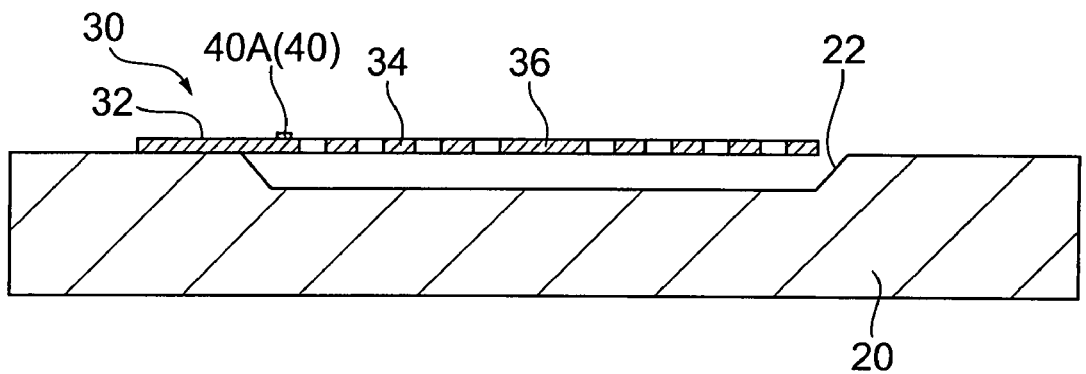

Here, FIG. 4 is a sectional view showing a procedure for making the sensing unit 10, taken along the line II-II of FIG. 1, (a) to (d) thereof showing cross-sections of the sensing unit 10 at various processing stages. FIG. 5 is also a sectional view showing a procedure for making the sensing unit 10, taken along the line II-II of FIG. 1, (a) to (c) thereof showing cross-sections of the sensing unit 10 at various processing stages. FIG. 6 is a sectional view showing a procedure for making the sensing unit 10, taken along a line VI-VI of FIG. 1, (a) and (b) thereof showing cross-sections of the sensing unit 10 at various processing stages.

When making the sensing unit 10, first the $Al_2O_3$ substrate 20 is prepared, and then the hole 22 having a circular cross-section is formed therein in a predetermined position. Photoresist (a resist layer) 50 is applied so as to bury the hole 22 completely, whereupon an $Al_2O_3$ layer 52 is deposited on the entire surface of the substrate 20 so as to cover the photoresist 50 (see (a) of FIG. 4).

Next, the hole 22 is exposed by performing polishing up to the position of the substrate 20 using chemical-mechanical polishing (CMP). As a result, the hole 22 formed in the substrate 20 remains buried by the photoresist 50 such that the substrate 20 is flat (see (b) of FIG. 4).

Next, an $Al_2O_3$ insulating film 54A is deposited on the flat substrate 20, and a first plating layer 56A having a rectangular cross-section is plate-formed into a similar shape to the spring portion 30 described above. Next, an $Al_2O_3$ insulating film 54B is deposited on the surface of the substrate 20 so as to cover the first plating layer 56A, and substantially rectangular second and third plating layers 56B, 56C are plate-formed on either side of the first plating layer 56A so as to be higher than the first plating layer 56A (see (c) of FIG. 4). These plating layers 56 (56A, 56B, 56C) eventually become the spring portion 30 described above. Accordingly, the plating layers 56 are formed such that the part that is to become the support portion 32 is positioned on the edge portion of the hole 22 and the part that is to become the movable portion 34 is positioned on the photoresist 50 within the hole 22.

Next, the $Al_2O_3$ insulating film is removed by etching from all parts other than the formation region of the plating layers 56. Further, photoresist (a resist layer) 60 is formed in the region corresponding to the hole 22 and covered with an $Al_2O_3$ layer 62 from above (see (d) of FIG. 4).

Next, the $Al_2O_3$ layer 62, photoresist 60, and plating layers 56B, 56C are polished using CMP to a position in which the first plating layer 56A is exposed (see (a) of FIG. 5).

Next, the photoresist 60 and the photoresist 50 formed in the region corresponding to the hole 22 in the substrate 20 are removed to form a space around and below the plating layers 56 (see (b) of FIG. 5). As a result, the spring portion 30 constituted by the three plating layers 56A, 56B, 56C, which are divided by the $Al_2O_3$ insulating films 54 (54A, 54B), is formed.

Finally, the $Al_2O_3$ layer 62 on the substrate 20 is selectively removed by etching, whereby manufacture of the spring portion 30 of the sensing unit 10 is complete (see (c) of FIG. 5).

The sensor portions 40 are formed at the stage shown in (a) of FIG. 5. More specifically, as shown in (a) of FIG. 6, when the plating layers 56 for forming the spring portion 30 are buried in the photoresist 60, 50 and the $Al_2O_3$ layer 62 such that the substrate surface is flat, the sensor portions 40 are formed on the plating layers 56 for forming the movable portion 34 via an insulating film 41.

After making the sensor portions 40, the photoresist 60 and the photoresist 50 formed in the region corresponding to the hole 22 in the substrate 20 are removed and the $Al_2O_3$ layer 62 on the substrate 20 is selectively removed by etching, as described above, whereby manufacture of sensing unit 10 is complete (see (b) of FIG. 6).

Figure 7:
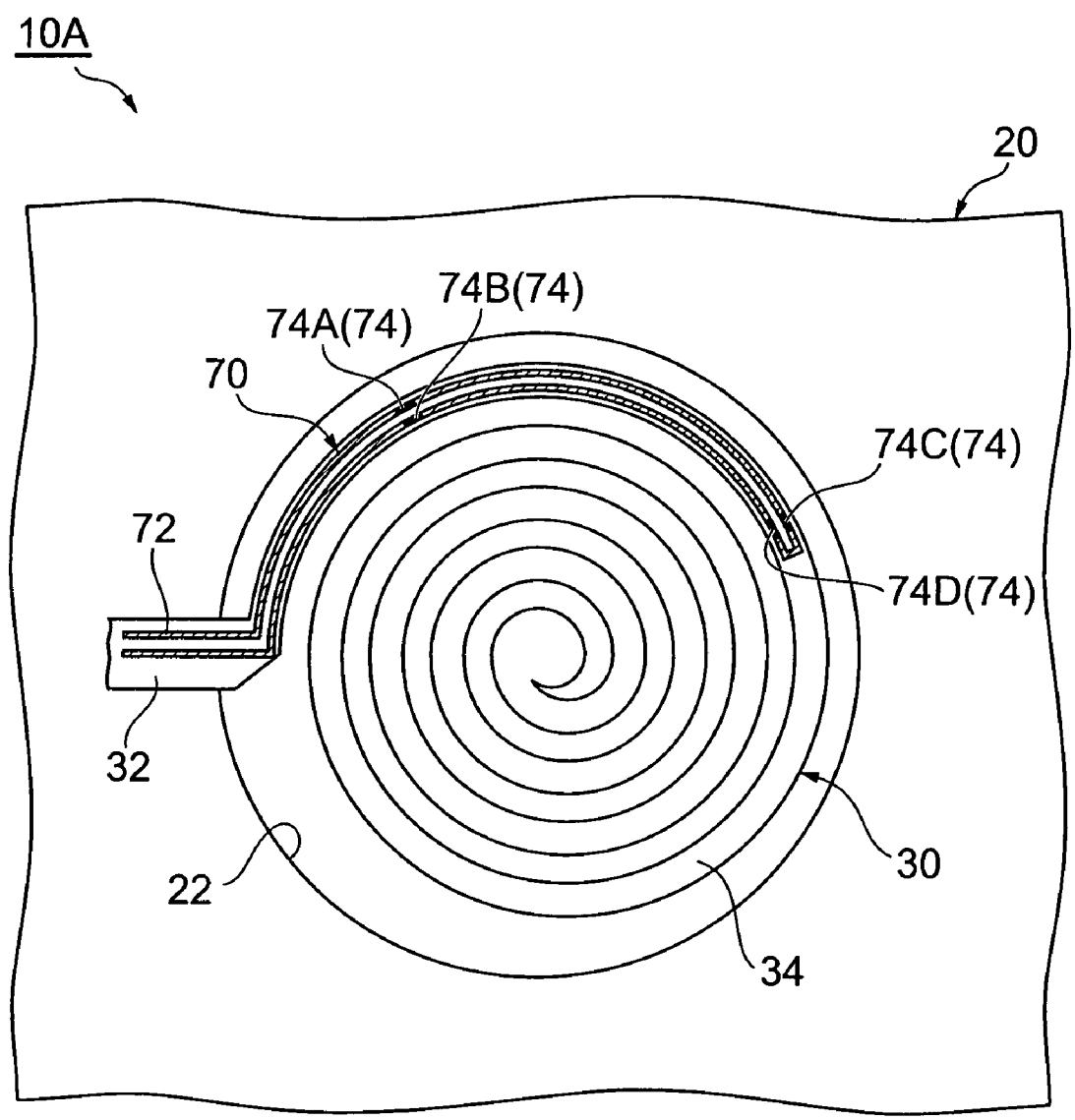
FIG. 7 is a plan view showing the schematic constitution of a sensing unit according to a different aspect to that shown in FIG. 1.

Next, a sensing unit 10A according to a different aspect to the sensing unit 10 described above will be described. FIG. 7 is a plan view showing the schematic constitution of the sensing unit 10A.

As shown in FIG. 7, the sensing unit 10A has a similar spring portion to the spring portion 30 of the sensing unit 10. Sensor wiring 70 is formed on the spring portion 30. The sensor wiring 70 is constituted by a single signal wire 72 and two pairs of sensor portions 74 (74A to 74D) provided at points on the signal wire 72. The sensor portions 74 are disposed on the movable portion 34 of the spring portion 30, and are constituted by well-known sensors capable of detecting displacement in the movable portion 34. The pairs of sensor portions 74 (74A and 74B, 74C and 74D) are arranged in the width direction of the movable portion 34 and positioned at the two end portions in the width direction. Displacement-related signals detected by the sensor portions 74 are transmitted to a control portion, not shown in the drawing, via the signal wire 72.

By employing the sensor wiring 70 in the sensing unit 10A, acceleration detection can be performed even when the spring portion 30 is formed from an insulating material.

The present invention is not limited to the embodiment described above, and may be subjected to various modifications. For example, the sensor portion is not limited to a GMR sensor, and may be changed appropriately to another well-known sensor (an MR sensor or the like).

What is claimed is:

1. A sensing unit comprising:
   a substrate formed with a recessed portion;
   a spring portion having a support portion positioned on an edge portion of said recessed portion and a flat coil-shaped movable portion positioned above said recessed portion and supported floatably by said support portion; and
   a sensor portion provided on said movable portion of said spring portion, for detecting displacement in said movable portion.

2. The sensing unit according to claim 1, wherein said spring portion is formed from a conductive material.

3. The sensing unit according to claim 1, wherein said spring portion is formed by plating.

4. The sensing unit according to claim 1, wherein said sensor portion is constituted by a GMR sensor.

5. The sensing unit according to claim 1, wherein a weighted portion is formed on a center side end portion of said movable portion of said spring portion.

6. The sensing unit according to claim 1, wherein said sensor portion is provided on said movable portion in a position near said support portion.

7. The sensing unit according to claim 1, wherein a plurality of sensor portions are provided on said movable portion.

8. The sensing unit according to claim 1, wherein said substrate is held so as to extend in a vertical direction.

9. The sensing unit according to claim 1, wherein said substrate is held so as to extend in a horizontal direction.

* * * * *